No. 860,638. PATENTED JULY 23, 1907.
H. E. COFFIN.
CRANK CASE AND BEARING FOR EXPLOSIVE ENGINES.
APPLICATION FILED MAY 7, 1906.

WITNESSES
INVENTOR
HOWARD E. COFFIN
BY
ATTYS.

UNITED STATES PATENT OFFICE.

HOWARD E. COFFIN, OF LANSING, MICHIGAN, ASSIGNOR TO OLDS MOTOR WORKS, OF LANSING, MICHIGAN, A CORPORATION OF MICHIGAN.

CRANK CASE AND BEARING FOR EXPLOSIVE-ENGINES.

No. 860,638.  Specification of Letters Patent.  Patented July 23, 1907.

Application filed May 7, 1906. Serial No. 315,480.

*To all whom it may concern:*

Be it known that I, HOWARD E. COFFIN, a citizen of the United States of America, residing at Lansing, in the county of Ingham and State of Michigan, have invented certain new and useful Improvements in Crank Cases and Bearings for Explosion-Engines, of which the following is a specification, reference being had therein to the accompanying drawings.

The invention relates to explosion engines of the two-cycle type in which the explosive charge is compressed in the crank casing before being introduced into the cylinder.

It is the object of the invention to obtain a construction of bearing for the crank shaft which is capable of adjustment to take up the wear, and which forms a gas-tight connection with the casing for preventing escape of the compressed charge.

Figure 1:
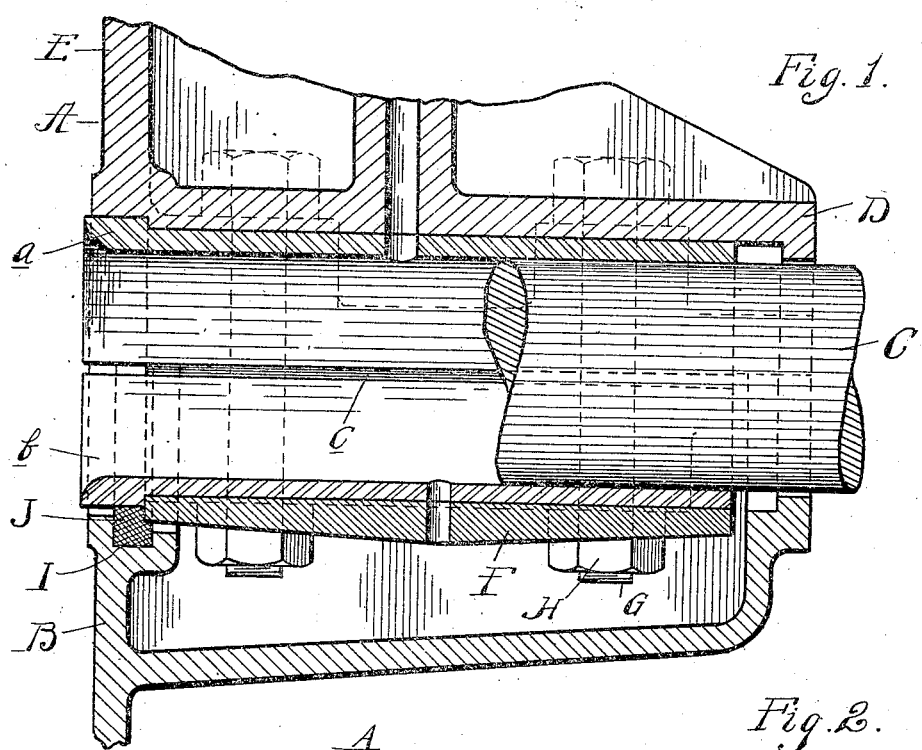
Figure 2:
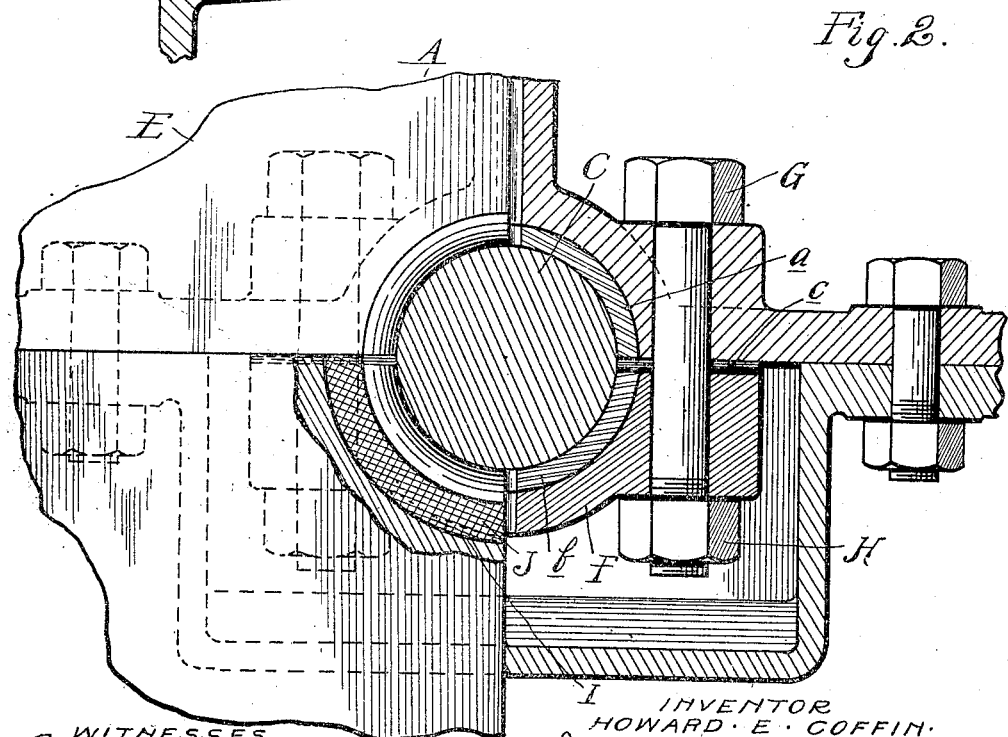

In the drawings, Figure 1 is a vertical section, in the plane of the crank shaft, through a portion of the crank casing and bearing; and Fig. 2 is a sectional elevation at right angles to Fig. 1 looking from inside the case.

The crank casing is preferably formed of two sections, A B, which adjoin each other in the horizontal plane of the crank shaft C. One of these sections, preferably the upper section A, has formed integral therewith the part bearing D for the shaft, which projects outward from the outer wall E on the casing. F is a complementary portion of the bearing, which is formed separate from the lower member B of the casing and is secured to the upper bearing D by suitable means, such as the bolts G and clamping nuts H. Both portions of the bearing are preferably provided with bushings $a$ $b$, which bear directly upon the shaft, and the space between the bearings at the sides is filled with shims $e$, so as to form a tight joint.

The lower portion B of the casing is formed to make a tight joint with the upper section A, and adjacent to the bearing F the outer wall is curved to fit around said bearing. This curved bearing is provided with a groove I, in which is placed a suitable resilient packing material J which is compressed against the outer face of the bearing F, and thus forms a tight joint to prevent leakage of the explosive charge.

As the bearing F is separate from the casing B, it is much less difficult to fit up the latter so as to form a tight joint than where the bearing is integral therewith; furthermore, as the bearing wears, this wear may be taken up by the adjustment of the member F, and a gas-tight joint is maintained by reason of the resiliency of the packing J, which will expand to maintain contact with the outer face of the bearing.

What I claim as my invention is:—

1. In a crank case bearing for an explosion engine the combination with a horizontally divided crank casing, adapted for the holding of an explosive charge therein, of a bearing for the crank shaft having one section thereof formed integral with said crank casing, and the other section separate therefrom and secured thereto, and a packing between the separate section and the casing.

2. In a crank case bearing for an explosion engine the combination with a horizontally divided crank casing adapted for the holding of an explosive charge therein, of a sectional bearing for the crank shaft having one section thereof formed integral with said casing, and an adjustable section separate from and secured to said casing, and means for packing the joint between said adjustable section and casing in different positions of adjustment of the former.

3. In a crank case bearing for an explosion engine the combination with a horizontally divided crank casing adapted for the holding of an explosive charge therein, of a bearing for the crank shaft having a section thereof formed integral with said casing, and an adjustable section separate from and secured to said casing, and a resilient packing between said adjustable section and the casing.

4. In a crank case bearing for an explosion engine, a sectional crank casing adapted for the holding of an explosive charge therein, the sections adjoining each other in the plane of the crank shaft, a sectional bearing for said crank shaft having one section thereof integral with one section of said casing and secured to said integral bearing section, and an adjustable section separate from the casing, and a packing between said adjustable section and the casing.

In testimony whereof I affix my signature in presence of two witnesses.

HOWARD E. COFFIN.

Witnesses:
CHAS. D. HASTINGS,
CHAS. P. MILLER.